(12) United States Patent
Cho

(10) Patent No.: US 7,520,441 B2
(45) Date of Patent: *Apr. 21, 2009

(54) CHIP CARD WITH SIMULTANEOUS CONTACT AND CONTACT-LESS OPERATIONS

(75) Inventor: Zang-Hee Cho, Suwon-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/811,254

(22) Filed: Jun. 8, 2007

(65) Prior Publication Data

US 2007/0243901 A1    Oct. 18, 2007

Related U.S. Application Data

(63) Continuation of application No. 10/852,610, filed on May 24, 2004, now Pat. No. 7,246,750.

(30) Foreign Application Priority Data

Sep. 5, 2003    (KR)    ............... 2003-0062251

(51) Int. Cl.
    G06K 19/00    (2006.01)

(52) U.S. Cl. .................. 235/492; 455/550.1
(58) Field of Classification Search ............. 235/492, 235/440, 441, 451; 455/550.1
See application file for complete search history.

(56) References Cited

U.S. PATENT DOCUMENTS 5,773,812 A *  6/1998  Kreft ................ 235/492
6,973,327 B2 * 12/2005  Seita ................ 455/550.1

OTHER PUBLICATIONS

European Patent Publication No. EP 0 534 559 A1 entitled "Chip Card Allowing Remote Identification".

* cited by examiner

Primary Examiner—Daniel A Hess
(74) Attorney, Agent, or Firm—Monica H. Choi

(57) ABSTRACT

A chip card receives and processes what-ever combination of contact data and contact-less data is available to allow multiple functionalities for the chip card. A micro-computer of the chip card is adapted to simultaneously receive and process contact data from a contact interface and contact-less data from a contact-less interface. In addition, the chip card includes a power voltage selector for selecting a contact bias to supply power to the micro-computer when-ever the contact bias voltage is available since the contact bias voltage is more stable than a contact-less bias voltage.

13 Claims, 8 Drawing Sheets

CHIP CARD WITH SIMULTANEOUS CONTACT AND CONTACT-LESS OPERATIONS

CROSS-REFERENCE TO RELATED APPLICATION(S)

The present application is a continuation of an earlier filed copending patent application with Ser. No. 10/852,610 filed on May 24, 2004, now U.S. Pat. No. 7,246,750 for which priority is claimed. This earlier filed copending patent application with Ser. No. 10/852,610 is in its entirety incorporated herewith by reference.

The present application also claims priority under 35 USC § 119 to Korean Patent Application No. 2003-0062251, filed on Sep. 5, 2003, in the Korean Intellectual Property Office, the disclosure of which is incorporated herein in its entirety by reference. A certified copy of Korean Patent Application No. 2003-0062251 is contained in the parent copending patent application with Ser. No. 10/852,610.

TECHNICAL FIELD

The present invention relates generally to chip cards (i.e., "smart cards"), and more particularly, to a chip card having a contact interface, a contact-less interface, and a micro-computer adapted for simultaneous contact and contact-less operations.

BACKGROUND OF THE INVENTION

Chip cards or IC (integrated circuit) cards (also commonly referred to as "smart cards") by now are prevalently used in many applications such as for authentications, banking transactions, and payments. FIG. 1 shows a chip card 102 of a contact type according to the prior art. For such a chip card 102, a contact bank 104 and an IC (integrated circuit) chip 106 are formed onto a substrate 108 typically with a shape similar to a credit-card, according to ISO standards as known to one of ordinary skill in the art. The contact bank 104 has a plurality of contacts 110, each receiving a respective signal, such as a supply voltage, a clock signal, or data, from a contact based terminal. The IC chip 106 processes data from such signals received by the contact bank 104 after making contact with the contact based terminal.

FIG. 2 shows a chip card 112 of a contact-less type according to the prior art. For such a chip card 112, at least one antenna coil (a first antenna coil 114 and a second antenna coil 116 in the example of FIG. 2) and an IC chip 18 are formed onto a substrate 120 typically with a shape similar to a credit-card, according to ISO standards as known to one of ordinary skill in the art. The antenna coils 114 and 116 are inductively coupled to a corresponding antenna on a contact-less based terminal for transmission of signals, such as a supply voltage, a clock signal, and data. The IC chip 118 processes data from such signals received by at least one of the antenna coils 114 and 116.

A disadvantage of the chip card 102 of the contact type in FIG. 1 is that the contacts of the contact bank 104 are easily worn due to careless treatment or to frequent contact with a terminal. A disadvantage of the chip card 112 of the contact-less type in FIG. 2 is that supply power provided to the IC chip 118 via inductive coupling to the antenna coils 114 and 116 is unstable due to noise between the chip card 120 and a contact-less based terminal.

FIG. 3 shows a chip card 122 of a combined type according to the prior art. For such a chip card 122, both a contact bank 124 and at least one antenna coil (a first antenna coil 126 and a second antenna coil 128 in the example of FIG. 3) in addition to an IC chip 130 are formed onto a substrate 132 with a shape similar to a credit card, according to ISO standards as known to one of ordinary skill in the art.

FIG. 4 shows components within the IC chip 130 for the chip card 122 of the combined type in the prior art. The IC chip 130 includes a signal selection unit 134 that inputs first signals received by the contact bank 124 and second signals received by at least one of the antenna coils 126 and 128. The signal selection unit 134 selects one of such signals to be processed by a micro-computer 136 of the IC chip 130. The micro-computer 136 typically includes a data register 138 for storing data during processing by the micro-computer 136.

The signal selection unit 134 selects one of the first or second signals received by the contact bank 124 or at least one of the antenna coils 126 and 128 depending on an assigned priority. FIG. 5 shows a flowchart of steps for operation of the IC chip 130 when contact-less operation is assigned higher priority over contact operation. In that case, upon power-on (at step 140 of FIG. 5) of the IC chip 130, the signal selection unit 134 checks for availability of a RF voltage supply (RF_VDD) (at step 142 of FIG. 5). Such RF_VDD is derived from an RF signal received by at least one of the antenna coils 126 and 128.

If such RF_VDD is available (at step 142 of FIG. 5), the signal selection unit 134 selects signals received by the antenna coils 126 and 128 to be processed by the micro-computer 136. Thus, RF_VDD is selected to supply power to the micro-computer 136 (at step 144 of FIG. 5), and the data register 138 is reset (at step 146 of FIG. 5). RF data (RF_IO) derived from the RF signal received by at least one of the antenna coils 126 and 128 is then processed by the micro-computer 136 (at step 148 of FIG. 5) before power-off (at step 150 of FIG. 5) of the IC chip 130.

Further referring to FIG. 5, if RF_VDD is not available (at step 142 of FIG. 5), the signal selection unit 134 selects signals received via the contact bank 124 to be processed by the micro-computer 136. Thus, a contact voltage (CNT_VDD) received via the contact bank 124 is selected to supply power to the micro-computer 136 (at step 152 of FIG. 5), and the data register 138 is reset (at step 154 of FIG. 5). Contact data (CNT_IO) received via the contact bank 124 is then processed by the micro-computer 136 (at step 156 of FIG. 5) before power-off (at step 158 of FIG. 5) of the IC chip 130.

FIG. 5 also illustrates (outlined in dashed lines in FIG. 5) steps of operation when at least one of the antenna coils 126 and 128 receives RF signals to be processed by the micro-computer before, during, or after processing of CNT_IO (around step 156 of FIG. 5). In FIG. 5, contact-less operation is assigned higher priority over contact operation. Thus, if RF_VDD becomes available (at step 160 of FIG. 5), shortly before, during, or shortly after processing of CNT_IO (around step 156 of FIG. 5) via interrupt of (or polling by) the micro-computer 136, processing of CNT_IO (at step 156 of FIG. 5) is prematurely aborted, and steps 144, 146, 148, and 150 are performed instead to process the RF_IO.

Because the data register 136 is reset at step 146, results from previous processing of CNT_IO (at step 156 of FIG. 5) are disadvantageously lost. If RF_VDD is not available (at step 160 of FIG. 5) during such interrupt/polling, the micro-computer 136 continues with processing of CNT_IO (at step 156 of FIG. 5).

Alternatively, FIG. 6 shows a flowchart of steps for operation of the IC chip 130 when contact operation is assigned higher priority over contact-less operation. In that case, upon power-on (at step 162 of FIG. 6) of the IC chip 130, the signal selection unit 134 checks for availability of CNT_VDD from the contact bank 124 (at step 164 of FIG. 6).

If such CNT_VDD is available (at step 164 of FIG. 6), the signal selection unit 134 selects signals received by the contact bank 124 to be processed by the micro-computer 136. Thus, CNT_VDD is selected to supply power to the micro-computer 136 (at step 166 of FIG. 6), and the data register 138 is reset (at step 168 of FIG. 6). Contact data (CNT_IO) received via the contact bank 124 is then processed by the micro-computer 136 (at step 170 of FIG. 6) before power-off (at step 172 of FIG. 6) of the IC chip 130.

Further referring to FIG. 6, if CNT_VDD is not available (at step 164 of FIG. 6), the signal selection unit 134 selects signals received via at least one of the antenna coils 126 and 128 to be processed by the micro-computer 136. Thus, RF_VDD is selected to supply power to the micro-computer 136 (at step 174 of FIG. 6), and the data register 138 is reset (at step 176 of FIG. 6). In addition, RF_IO is processed by the micro-computer 136 (at step 178 of FIG. 6) before power-off (at step 180 of FIG. 6) of the IC chip 130.

FIG. 6 also illustrates (outlined in dashed lines in FIG. 6) steps of operation if the contact bank 124 receives signals to be processed by the micro-computer before, during, or after processing of RF_IO (around step 178 of FIG. 6). In FIG. 6, contact operation is assigned higher priority over contact-less operation. Thus, if CNT_VDD becomes available (at step 182 of FIG. 6), shortly before, during, or shortly after processing of RF_IO (around step 178 of FIG. 6) via interrupt of (or polling by) the micro-computer 136, processing of RF_IO (at step 178 of FIG. 6) is prematurely aborted, and steps 166, 168, 170, and 172 are performed instead to process the CNT_IO.

Because the data register 136 is reset at step 168, results from previous processing of RF_IO (at step 178 of FIG. 6) are disadvantageously lost. If CNT_VDD is not available (at step 182 of FIG. 6) during such interrupt/polling, the micro-computer 136 continues with processing of RF_IO (at step 178 of FIG. 6).

In either FIG. 5 or FIG. 6 of the prior art, processing of CNT_IO (contact data) or RF_IO (contact-less data) may be prematurely aborted, and the results of such processing are disadvantageously lost. In addition, if both RF_IO and CNT_IO are simultaneously received at the chip card 122, the micro-computer completely ignores and does not process one of RF_IO and CNT_IO depending on the assigned priority between contact and contact-less operations. However, any of such data available to the chip card may be desired to be processed for multiple functionality of the chip card.

SUMMARY OF THE INVENTION

Accordingly, a chip card in a general aspect of the present invention processes what-ever combination of contact data (CNT_IO) and contact-less data (RF_IO) is received by the chip card.

In one embodiment of the present invention, a chip card includes a micro-computer, a contact interface for transmission of data between a contact bank and the micro-computer, and a contact-less interface for transmission of data between at least one antenna and the micro-computer. The micro-computer is adapted to simultaneously receive contact data from the contact interface and contact-less data from the contact-less interface. The micro-computer is adapted to process the received contact and contact-less data.

In another embodiment of the present invention, the micro-computer is adapted to receive and process what-ever combination of contact data and contact-less data is derived and sent from the contact interface and the contact-less interface. In an example embodiment, the contact data and the contact-less data are simultaneously sent to the micro-computer from the contact interface and the contact-less interface, respectively.

In a further embodiment of the present invention, the micro-computer is adapted to send at least one control signal to dictate whether each of the contact data and the contact-less data is sent to the micro-computer.

In yet another embodiment of the present invention, a chip card includes a micro-computer, a contact interface for deriving a contact bias voltage from a signal on a contact bank, and a contact-less interface for deriving a contact-less bias voltage from a signal on at least one antenna. In addition, the chip card includes a power voltage selector for selecting the contact bias to be supplied to the micro-computer when-ever the contact bias voltage is available. The contact bias voltage is selected over the contact-less bias voltage because the contact bias voltage is more stable.

In such an embodiment of the present invention, the power voltage selector selects the contact-less bias voltage to be supplied to the micro-computer when the contact-less bias voltage is available and when the contact bias voltage is not available. In that case, the power voltage selector switches to select the contact bias voltage to be supplied to the micro-computer when-ever the contact bias voltage becomes available. In addition, the power voltage selector selects the contact bias voltage to be supplied to the micro-computer when both the contact bias voltage and the contact-less bias voltage are available.

In an example embodiment of the present invention, the power voltage selector includes a first switch that turns on to couple the contact bias voltage to the micro-computer when-ever the contact bias voltage is available. In addition, a second switch turns on to couple the contact-less bias voltage to the micro-computer when the contact-less bias voltage is available and when the contact bias voltage is not available.

In this manner, the chip card processes what-ever combination of contact data (CNT_IO) and contact-less data (RF_IO) is available to the chip card for multiple functionality. For example, contact data may be processed for making a phone call simultaneously with processing contact-less data for making a payment.

These and other features and advantages of the present invention will be better understood by considering the following detailed description of the invention which is presented with the attached drawings.

BRIEF DESCRIPTION OF THE DRAWINGS

The figures referred to herein are drawn for clarity of illustration and are not necessarily drawn to scale. Elements having the same reference number in FIGS. 1, 2, 3, 4, 5, 6, 7, 8, 9, 10, and 11 refer to elements having similar structure and function.

DETAILED DESCRIPTION

Figure 1:
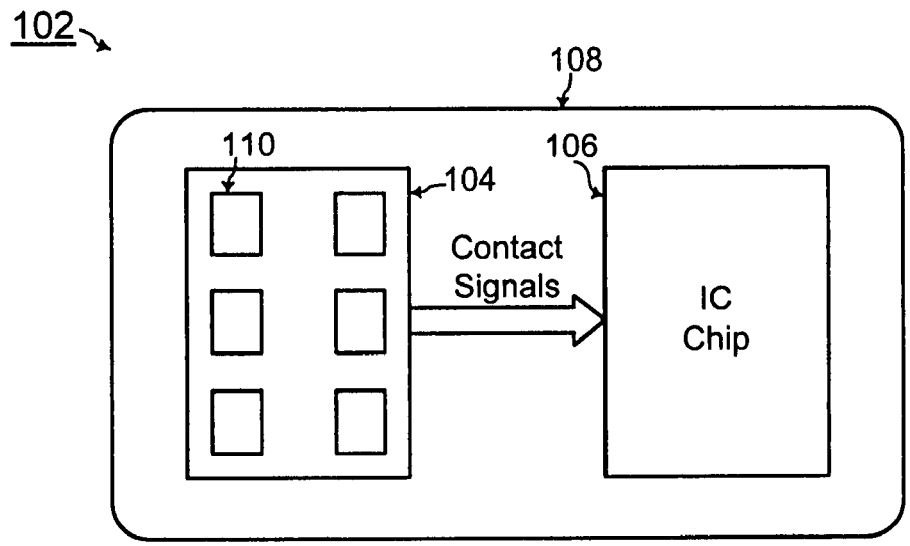
FIG. 1 shows a block-diagram of a chip card of the contact type, according to the prior art.
Figure 2:
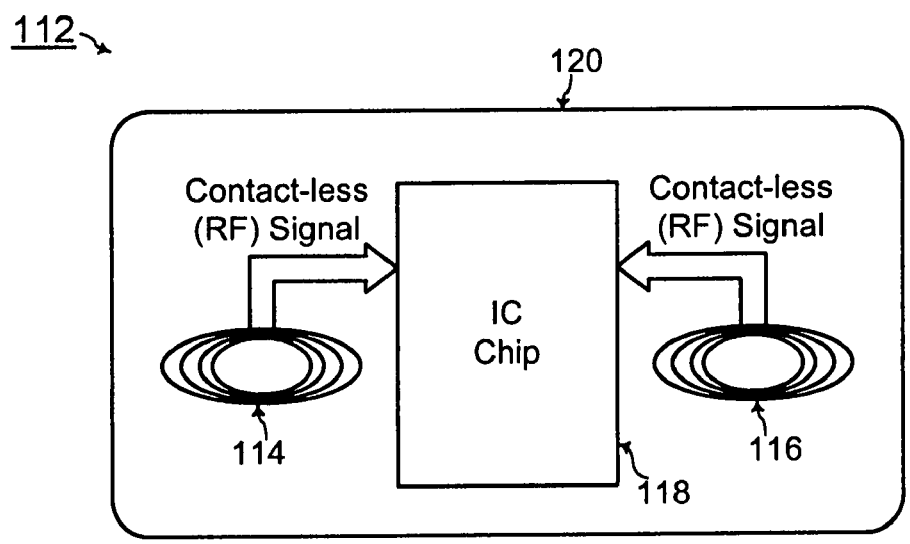
FIG. 2 shows a block-diagram of a chip card of the contact-less type, according to the prior art.
Figure 3:
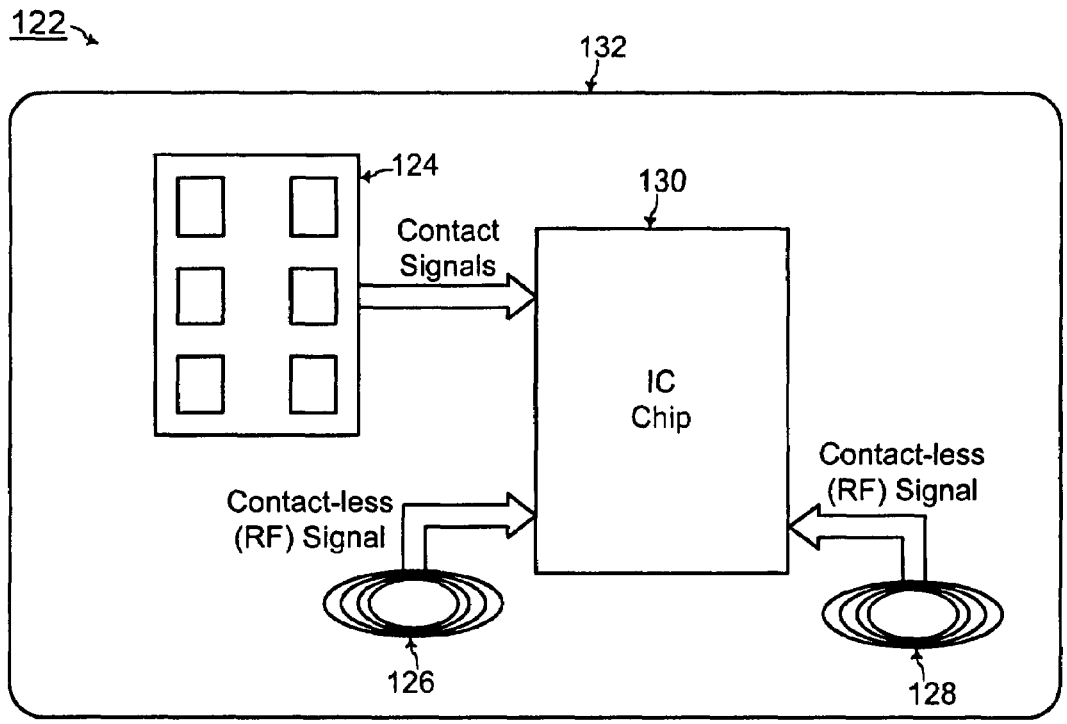
FIG. 3 shows a block-diagram of a chip card of the combined type, according to the prior art.
Figure 4:
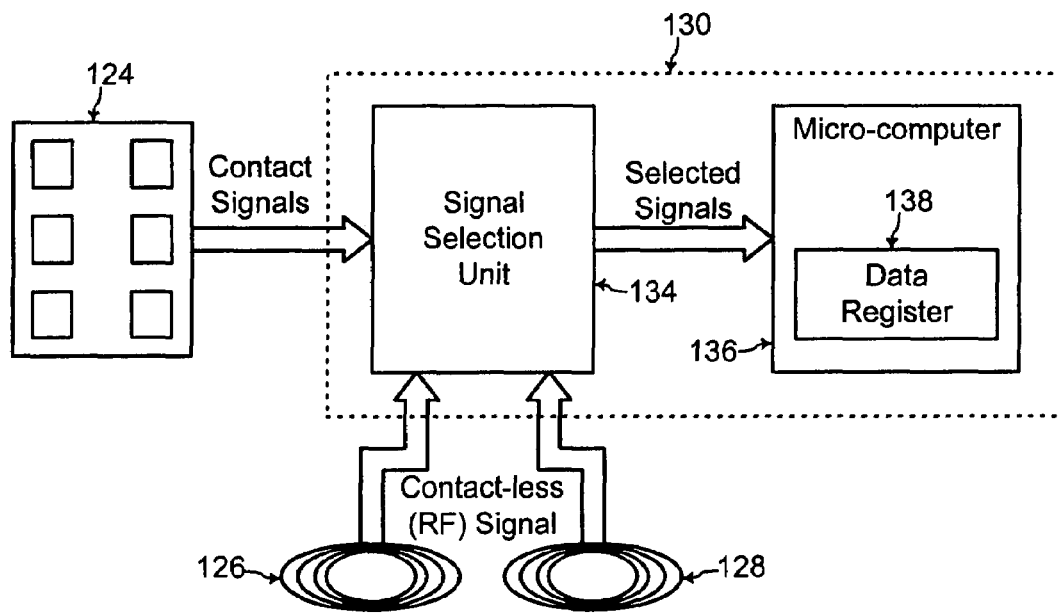
FIG. 4 shows components within an IC chip of the chip card of FIG. 3, according to the prior art.
Figure 5:
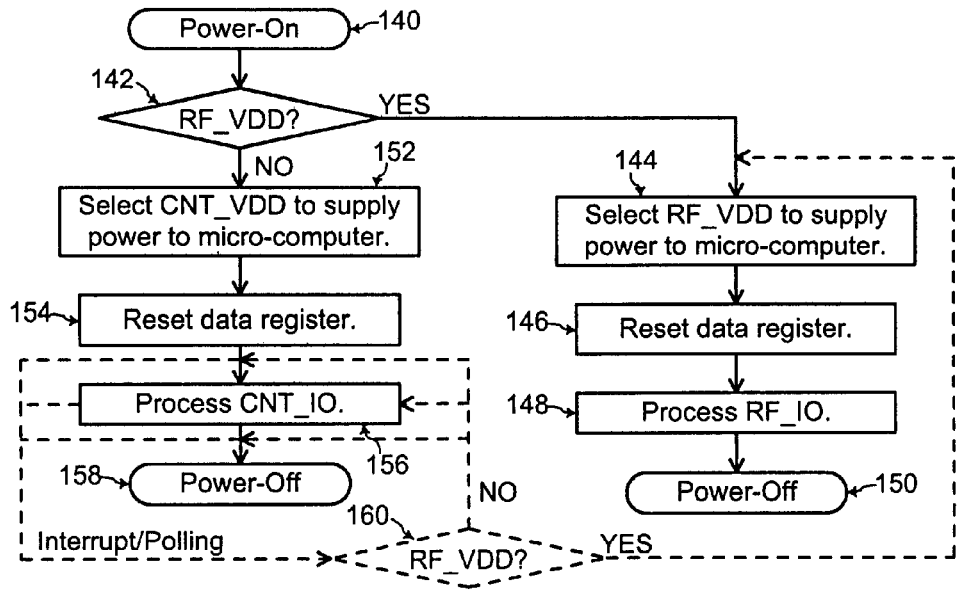
FIG. 5 shows a flowchart of steps for operation of the IC chip of FIG. 4 when contact-less operation is assigned higher priority over contact operation, according to the prior art.
Figure 6:
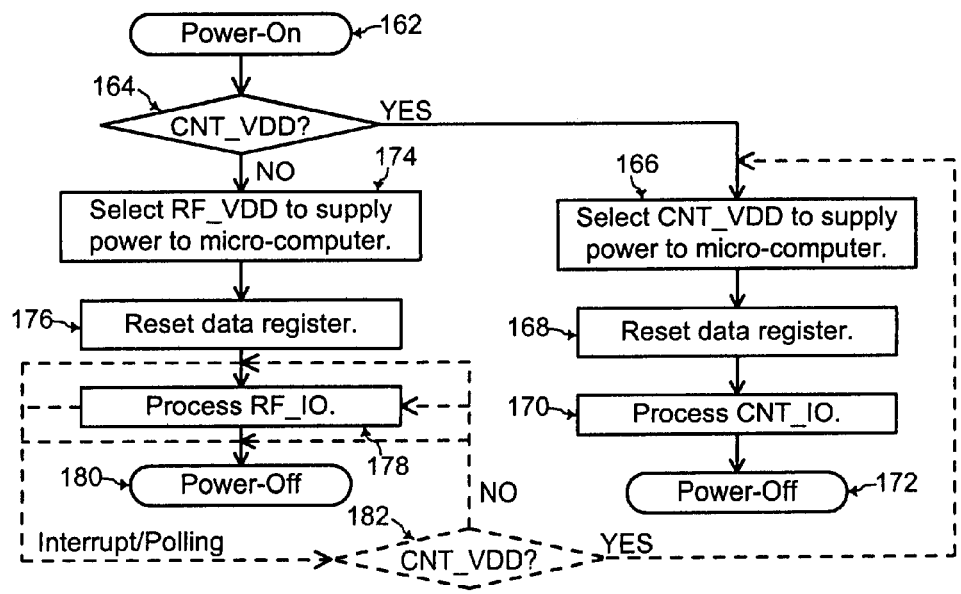
FIG. 6 shows a flowchart of steps for operation of the IC chip of FIG. 4 when contact operation is assigned higher priority over contact-less operation, according to the prior art.
Figure 7:
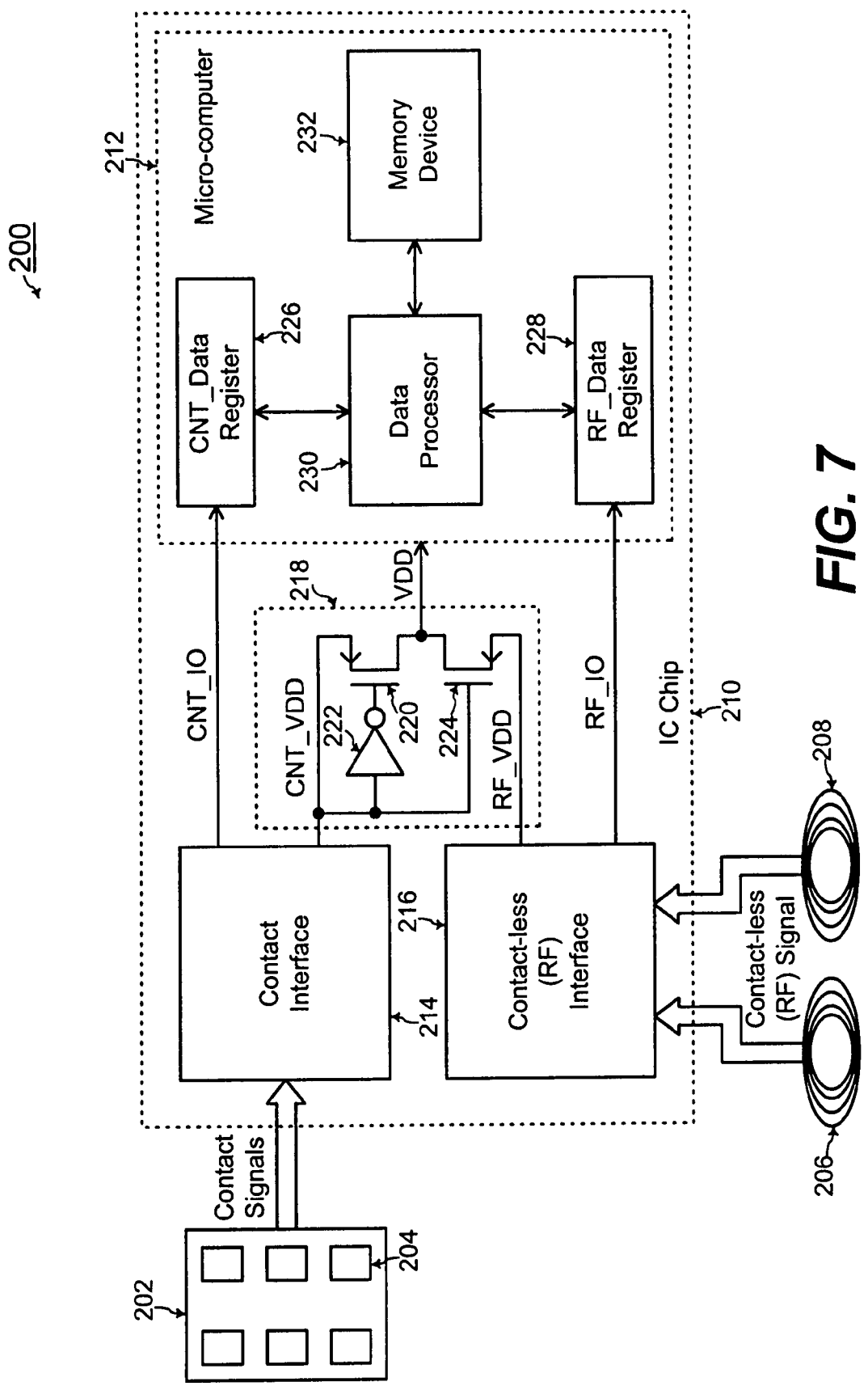
FIG. 7 shows a chip card of the combined type for processing any of contact data and contact-less data received by the chip card for multiple functionality, according to an embodiment of the present invention.

Referring to an embodiment of the present invention in FIG. 7, a chip card 200 of the combined type includes both a contact bank 202 having a plurality of contacts 204 and at least one antenna coil (a first antenna coil 206 and a second antenna coil 208 in the example of FIG. 7). The contact bank 202 and the first and second antenna coils 206 and 208 are coupled to an IC (integrated circuit) chip 210 (outlined in dashed lines in FIG. 7).

The contact bank 202, the antenna coils 206 and 208, and the IC chip 210 are formed onto a substrate (not shown in FIG. 7) for the chip card 200. The substrate for the chip card 200 typically has a shape similar to a credit-card, and physical placement of the contact bank 202, the antenna coils 206 and 208, and the IC chip 210 onto the substrate is dictated by ISO standards as known to one of ordinary skill in the art.

The IC chip 210 includes a micro-computer 212 (outlined in dashed lines in FIG. 7) and a contact interface 214 coupled between the contact bank 202 and the micro-computer 212. The contact interface 214 receives the signals from the contacts of the contact bank 202 and derives contact data (CNT_IO) and a contact bias voltage (CNT_VDD) from such signals. Implementation of such a contact interface 214, individually, is known to one of ordinary skill in the art.

The IC chip 210 further includes a contact-less interface 216 coupled between the antenna coils 206 and 208 and the micro-computer 212. The contact-less interface 216 receives an RF (radio frequency) signal from at least one of the antenna coils 206 and 208 and derives contact-less data (RF_IO) and a contact-less bias voltage (RF_VDD) from such a signal. Implementation of such a contact-less interface 216, individually, is known to one of ordinary skill in the art.

Note that the RF (radio frequency) designation is used herein to refer to contact-less signals. However, the present invention may be practiced for any type of contact-less signals having any frequency components (in addition to just the example of the radio frequency range) received by the antenna coils 206 and 208.

The IC chip 210 further includes a power voltage selector 218 (outlined in dashed lines in FIG. 7) that inputs CNT_VDD from the contact interface 214 and RF_VDD from the contact-less interface 216 and outputs a selected bias voltage (VDD) to the micro-computer 212. The power voltage selector 218 is comprised of a first PMOSFET 220 having a source coupled to CNT_VDD, a gate coupled to an output of an inverter 222, and a drain coupled to a drain of a second PMOSFET 224. The second PMOSFET 224 has a source coupled to RF_VDD and has a gate coupled to CNT_VDD. The drains of the PMOSFETs 220 and 224 are coupled together to the micro-computer 212.

The micro-computer 212 includes a contact data register 226 coupled to the contact interface 214, and includes a contact-less data register 228 coupled to the contact-less interface 216. The contact data register 226 and the contact-less data register 228 are coupled to a data processor 230 of the micro-computer 212. The micro-computer 212 further includes a memory device 232 coupled to the data processor 230 for storing sequences of instructions to be executed by the data processor 230. The data processor 230 executes such sequences of instructions to perform the steps of the flowchart of FIG. 8.

Figure 8:
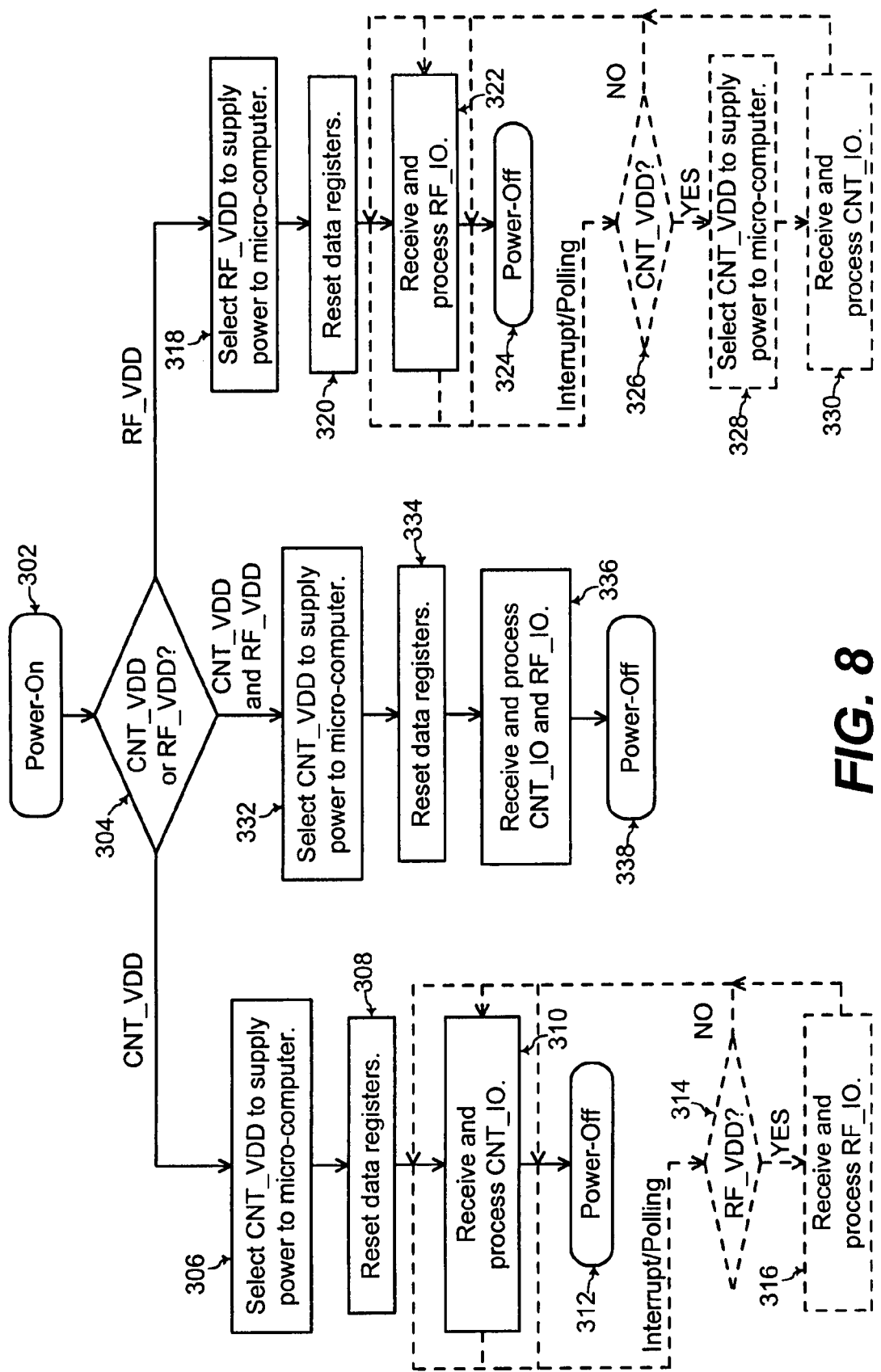
FIG. 8 shows a flowchart of steps during operation of the chip card of FIG. 7, according to an embodiment of the present invention.

Operation of the chip card 200 is now described in reference to the flowchart of FIG. 8. Upon power-on (at step 302 of FIG. 8) of the IC chip 210, the power voltage selector 218 operates depending on which of the contact bias voltage (CNT_VDD) and the contact-less bias voltage (RF_VDD) are available (at step 304 of FIG. 8). If the contact bank 202 receives signals from a contact based terminal, the contact interface 214 derives CNT_VDD from such signals such that CNT_VDD is available as a high voltage level to the power voltage selector 218. If at least one of the antenna coils 206 and 208 receives signals from a contact-less based terminal, the contact-less interface 216 derives RF_VDD from such signals such that RF_VDD is available as a high voltage level to the power voltage selector 218.

Consider the case when only CNT_VDD is available as a high voltage level to the power voltage selector 218 (at step 304 of FIG. 8). In that case, the contact bank 202 receives signals to be processed by the IC chip 210, while the antenna coils 206 and 208 do not receive any signals to be processed. Further in that case, the first PMOSFET 220 acts as a first switch that is turned on (while the second PMOSFET 224 is turned off) to select CNT_VDD as the bias voltage VDD for supplying power to the micro-computer 212 (at step 306 of FIG. 8).

The contact data register 226 and the contact-less data register 228 are reset (at step 308 of FIG. 8). Subsequently, the contact data register 226 receives and stores the contact data (CNT_IO) derived by the contact interface 214 (at step 310 of FIG. 8). The data processor 230 then processes such CNT_IO (at step 310 of FIG. 8) before power-off (at step 312 of FIG. 8) of the IC chip 210.

FIG. 8 also illustrates (outlined in dashed lines in FIG. 8) steps of operation when at least one of the antenna coils 206 and 208 receives signals to be processed before, during, or after processing of CNT_IO (around step 310 of FIG. 8). RF_VDD may become available (at step 314 of FIG. 8), shortly before, during, or shortly after processing of CNT_IO (around step 310 of FIG. 8) via interrupt of (or polling by) the micro-computer 212. In that case, the contact-less data (RF_IO) derived by the contact-less interface 216 is received and stored by the contact-less data register 228 (at step 316 of FIG. 8).

The data processor 230 then processes such RF_IO (at step 316 of FIG. 8), and the data processor 230 then returns to continue the processing of CNT_IO (at step 310 of FIG. 8). In this manner, the CNT_IO previously received at step 310 is not lost, and both CNT_IO and RF_IO are processed by the micro-computer 212 (with steps 310, 314, and 316 in FIG. 8). If RF_VDD is not available during the interrupt/polling (at step 314 of FIG. 8), the data processor 230 simply completes processing of CNT_IO (at step 310 of FIG. 8) before power-off (at step 312 of FIG. 8) of the IC chip 210.

In addition, even when RF_VDD becomes available (at step 314 of FIG. 8), the power voltage selector 218 continues to select CNT_VDD to supply power to the micro-computer 212. CNT_VDD is a more stable voltage source than RF_VDD which is more prone to noise. Thus, the power voltage selector 218 advantageously continues to select CNT_VDD to supply power to the micro-computer 212 even when RF_VDD becomes available (at step 314 of FIG. 8). Just the contact-less data (RF_IO) that becomes available is processed by the data processor 230 (at step 316 of FIG. 8), before power-off of the IC chip 210 (at step 312 of FIG. 8).

Alternatively, consider the case when only RF_VDD is available as a high voltage level to the power voltage selector 218 (at step 304 of FIG. 8). In that case, at least one of the antenna coils 206 and 208 receives signals to be processed by the IC chip 210, while the contact bank 202 does not receive any signals to be processed. Further in that case, the second PMOSFET 224 acts as a second switch that is turned on (while the first PMOSFET 220 is turned off) to select RF_VDD as the bias voltage VDD for supplying power to the micro-computer 212 (at step 318 of FIG. 8).

The contact data register 226 and the contact-less data register 228 are reset (at step 320 of FIG. 8). Subsequently, the contact-less data register 228 receives and stores the contact-less data (RF_IO) derived by the contact-less interface 216 (at step 322 of FIG. 8). The data processor 230 then processes such RF_IO (at step 322 of FIG. 8) before power-off (at step 324 of FIG. 8) of the IC chip 210.

FIG. 8 also illustrates (outlined in dashed lines in FIG. 8) steps of operation when the contact bank 202 receives signals to be processed before, during, or after processing of RF_IO (around step 322 of FIG. 8). CNT_VDD may become available (at step 326 of FIG. 8), shortly before, during, or shortly after processing of RF_IO (around step 322 of FIG. 8) upon interrupt of (or polling by) the micro-computer 212. In that case, the power voltage selector 218 switches to select CNT_VDD to supply power to the micro-computer 212 (at step 328 of FIG. 8).

When CNT_VDD becomes available as a high voltage level, the first PMOSFET 220 turns on, and the second PMOSFET 224 turns off such that CNT_VDD is coupled to the micro-computer 212. CNT_VDD is a more stable voltage source than RF_VDD which is more prone to noise. Thus, the power voltage selector 218 advantageously switches to select CNT_VDD to supply power to the micro-computer 212 when CNT_VDD becomes available (at step 328 of FIG. 8).

In addition, the contact data (CNT_IO) derived by the contact interface 214 is received and stored by the contact data register 226 (at step 330 of FIG. 8). The data processor 230 then processes such CNT_IO (at step 330 of FIG. 8), and the data processor 230 then returns to continue the processing of RF_IO (at step 322 of FIG. 8).

In this manner, the RF_IO previously received at step 322 is not lost, and both CNT_IO and RF_IO are processed by the micro-computer 212 (with steps 322, 326, and 330 in FIG. 8). In addition, as soon as CNT_VDD becomes available (at step 326 of FIG. 8) during processing of RF_IO (around step 322 of FIG. 8), the power voltage selector 218 advantageously switches to select the more stable CNT_VDD to supply power to the micro-computer 212 (at step 328 of FIG. 8). If CNT_VDD is not available during the interrupt/polling (at step 326 of FIG. 8), the data processor 230 simply completes processing of RF_IO (at step 322 of FIG. 8) before power-off (at step 324 of FIG. 8) of the IC chip 210.

Finally, consider the case when both RF_VDD and CNT_VDD are available as high voltage levels to the power voltage selector 218 (at step 304 of FIG. 8). In that case, both the contact bank 202 and at least one of the antenna coils 206 and 208 simultaneously receive signals to be processed by the IC chip 210. Further in that case, the first PMOSFET 220 is turned on while the second PMOSFET 224 is turned off to select CNT_VDD as the bias voltage for supplying power to the micro-computer 212 (at step 332 of FIG. 8).

The contact data register 226 and the contact-less data register 228 are reset (at step 334 of FIG. 8). Subsequently, the contact data register 226 receives and stores the contact data (CNT_IO) derived by the contact interface 214, while the contact-less data register 228 receives and stores the contact-less data (RF_IO) derived by the contact-less interface 216 (at step 336 of FIG. 8). The data processor 230 then processes such CNT_IO and RF_IO (at step 336 of FIG. 8) before power-off (at step 338 of FIG. 8) of the IC chip 210.

In this manner, both CNT_IO and RF_IO are simultaneously sent to the micro-computer 212 that simultaneously receives and stores such CNT_IO and RF_IO into the contact and contact-less data registers 226 and 228, respectively. The data processor 230 then processes such CNT_IO and RF_IO. In addition, when both CNT_VDD and RF_VDD are simultaneously available, the power voltage selector 218 advantageously selects the more stable CNT_VDD to supply power to the micro-computer 212.

With such operation of the IC chip 210 according to the flowchart of FIG. 8, any of the contact data (CNT_IO) and the contact-less data (RF_IO) derived by the contact and contact-less interfaces 214 and 216 is received and processed by the micro-computer 212. In contrast to the prior art, such data are not ignored, even when such data are sent simultaneously to the micro-computer 212. In addition, processing of such data is not aborted prematurely since the micro-computer 212 is adapted to process both of such data CNT_IO and RF_IO received at any time.

Thus, with such operation of the IC chip 210 according to the flowchart of FIG. 8, the micro-computer 212 is adapted to receive and process what-ever combination of CNT_IO and RF_IO is available at a time to the IC chip 210. Referring to FIG. 8, the micro-computer 212 receives and processes just the CNT_IO when only the CNT_IO is available to the IC chip 210. Alternatively, the micro-computer 212 receives and processes just the RF_IO when only the RF_IO is available to the IC chip 210. Finally, the micro-computer receives and processes CNT_IO and RF_IO when both are available simultaneously to the IC chip 210.

In contrast, the prior art chip card of the combined type processes only one of the RF_IO or CNT_IO at a time depending on the assigned priority between processing RF_IO versus CNT_IO, even when both are available. Thus, in the prior art chip card of the combined type, RF_IO or CNT_IO is lost or ignored when both become available.

Furthermore, the power voltage selector 218 advantageously selects the more stable CNT_VDD to supply power to the micro-computer 212 when-ever CNT_VDD is available. Thus, the power voltage selector 218 selects the less stable RF_VDD to supply power to the micro-computer 212 when CNT_VDD is not available and when RF_VDD is available.

Figure 9:
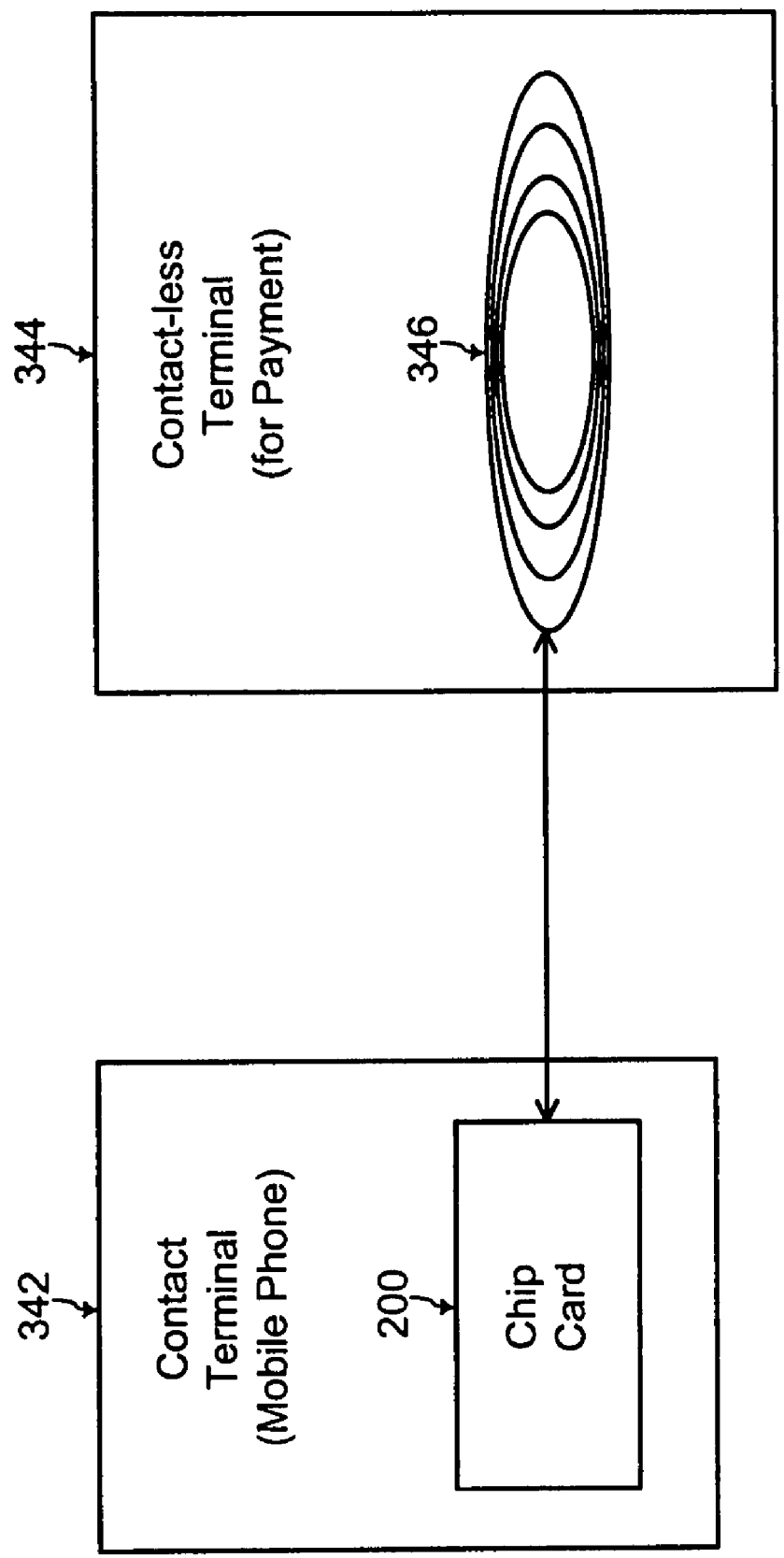
FIG. 9 illustrates use of the chip card of FIG. 7 in interaction with example contact and contact-less terminals, according to an embodiment of the present invention.

FIG. 9 illustrates an application of the chip card 200 of FIG. 7 for an example contact terminal 342 that is a mobile phone and an example contact-less terminal 344 that is for making a payment. The chip card 200 is installed onto the mobile phone 342 such that the contact bank 202 of the chip card 200 makes contact with the mobile phone 342. In that case, the micro-computer 212 processes CNT_IO from the mobile phone 342 to keep track of phone calls made using the mobile phone 342. The payment terminal 344 includes a terminal antenna 346 for transmission of signals to/from at least one of the antenna coils 206 and 208.

While a person is using the mobile phone 342 for making a phone call, the person may desire to make a payment to the payment terminal 344 using the chip card 200. For example, the payment terminal 344 may be used to make automatic payment at a subway station. While the person is using the mobile phone 342 to make a phone call, the person may simultaneously be walking into the subway station and may wish to make an automatic payment to the payment terminal 344 for using the subway station. The chip card 200 of the present invention allows such simultaneous functionalities by processing any of the contact data (CNT_IO) for making the phone call with the mobile phone 342, and the contact-less data (RF_IO) for making the automatic payment with the payment terminal 344.

The foregoing is by way of example only and is not intended to be limiting. For example, the RF (radio frequency) designation is used herein to refer to contact-less signals. However, the present invention may be practiced for any type of contact-less signals having any frequency components (in addition to just the example of the radio frequency range) received by the antenna coils 206 and 208. In addition, the components illustrated and described herein are by way of example only. For example, the data registers 226 and 228 may be implemented with any types of data storage devices, and any type of switching elements may be used for the PMOSFETs 220 and 224. Furthermore, the components illustrated and described herein for an example embodiment of the present invention may be implemented with any combination of hardware and/or software and in discrete and/or integrated circuits.

Figure 10:
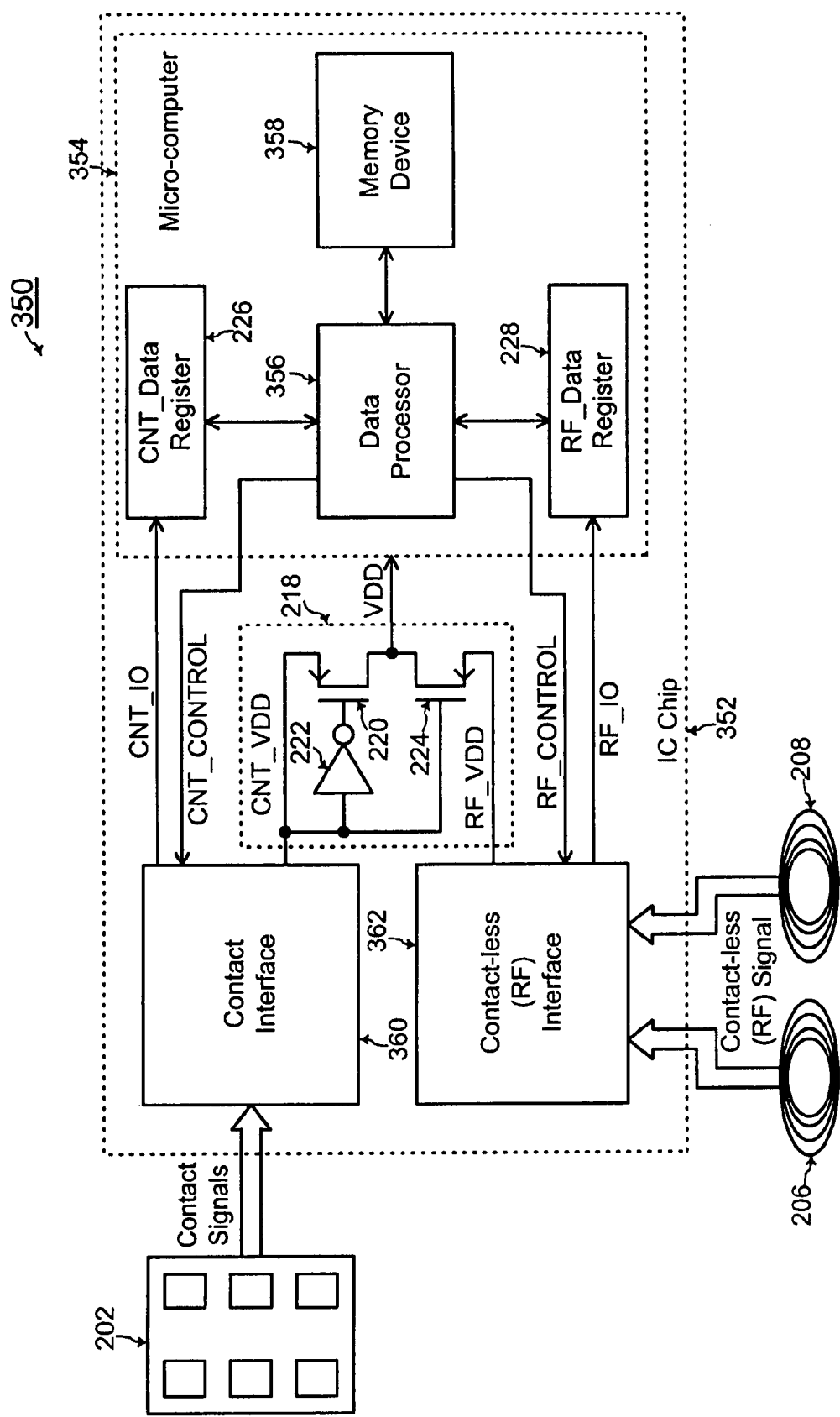
FIG. 10 shows modification of the chip card of FIG. 7 such that a micro-computer of the chip card dictates which of contact and contact-less interfaces are activated, according to another embodiment of the present invention.

Additionally, the chip card 200 may also include additional features from those described herein. For example, FIG. 10 illustrates an alternative chip card 350 that has an IC chip 352 modified from that of the chip card 200 of FIG. 7. A micro-computer 354 in FIG. 10 has a data processor 356 and a memory device 358 that are modified from that of the chip card 200 of FIG. 7. In addition, a contact interface 360 and a contact-less interface 362 in FIG. 10 are modified from that of the chip card 200 of FIG. 7.

When the data processor 356 executes sequences of instructions stored within the memory device 358 in FIG. 10, the data processor 356 has the feature of sending a contact control signal (CNT_CONTROL) for activating or deactivating the contact interface 360. In addition, the data processor 356 has the feature of sending a contact-less control signal (RF_CONTROL) for activating or deactivating the contact-less interface 362.

When CNT_CONTROL indicates that the contact interface 360 is deactivated, the contact interface 360 is adapted to ignore any signals received by the contact bank 202. Thus in that case, contact data (CNT_IO) is not sent to the micro-computer 354, and the contact bias voltage (CNT_VDD) is not generated for the power voltage selector 218. Similarly, when RF_CONTROL indicates that the contact-less interface 362 is deactivated, the contact-less interface 362 is adapted to ignore any signals received by the antenna coils 206 and 208. Thus in that case, contact-less data (RF_IO) is not sent to the micro-computer 354, and the contact-less bias voltage (RF_VDD) is not generated for the power voltage selector 218.

When CNT_CONTROL and RF_CONTROL indicate that the contact interface 360 is deactivated while the contact-less interface 362 is activated, the chip card performs the steps 302, 318, 320, 322, and 324 of FIG. 8 for processing just the contact-less data (RF_IO). Alternatively, when CNT_CONTROL and RF_CONTROL indicate that the contact-less interface 362 is deactivated while the contact interface 360 is activated, the chip card performs the steps 302, 306, 308, 310, and 312 of FIG. 8 for processing just the contact data (CNT_IO).

Finally, when CNT_CONTROL and RF_CONTROL indicate that both of the contact interface 360 and the contact-less interface 362 are activated, the chip card performs all of the steps of FIG. 8 for processing what-ever combination of the contact data (CNT_IO) and the contact-less data (RF_IO) is received at the chip card 350. In this manner, the chip card 350 provides additional flexibility by being programmable for selection of which of the contact data (CNT_IO) and the contact-less data (RF_IO) is sent to the micro-computer 354 for processing.

Figure 11:
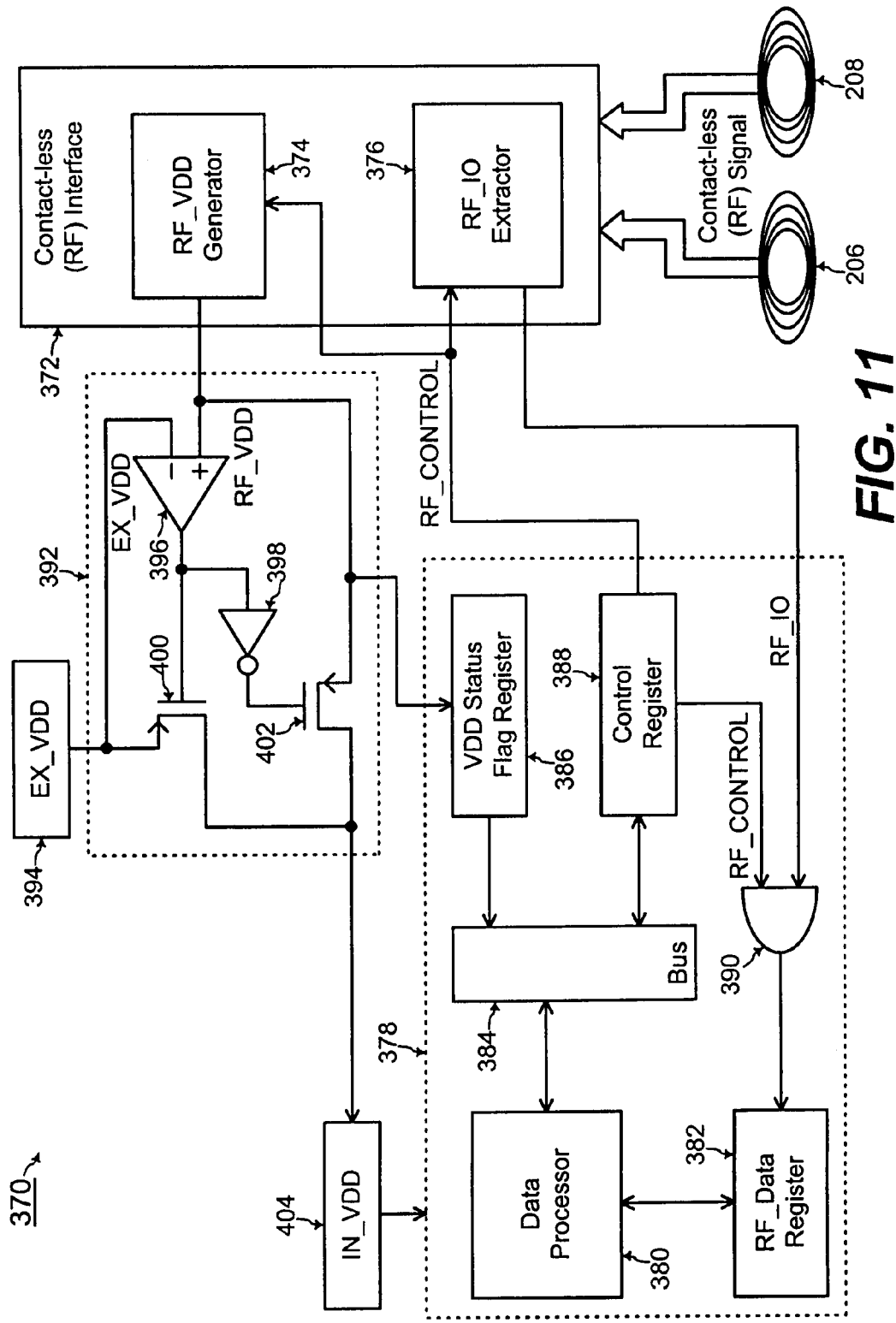
FIG. 11 shows a block diagram of alternative components for a chip card of the combined type, according to another embodiment of the present invention.

FIG. 11 shows another alternative chip card 370 for handling contact-less (RF) signals received at the antenna coils 206 and 208. A contact-less interface 372 includes a RF_VDD generator 374 that derives the contact-less bias voltage (RF_VDD) from such RF signals. The contact-less interface 372 also includes a RF_IO extractor 376 that derives the contact-less data (RF_IO) from such RF signals. Implementation for each of the RF_VDD generator 374 and the RF_IO extractor 376 individually is known to one of ordinary skill in the art.

RF_IO derived by the RF_IO extractor 376 is sent to a micro-computer 378 that includes a data processor 380 coupled to a contact-less data register 382 and a bus 384. In addition, the data processor 380 is coupled to a VDD status flag register 386 and a control register 388 via the bus 384. The contact-less data register 382 is coupled to an output of an AND gate 390 having as inputs an RF_CONTROL signal from the control register 388 and RF_IO from the RF_IO extractor 376.

The chip card 370 also includes a power voltage selector 392 that inputs RF_VDD from the RF_VDD generator 374 and an external bias voltage (EX_VDD) generated by an external VDD source 394. Generally, the present invention is practiced for any type of voltage source 394 that generates an alternative bias voltage EX_VDD that is more stable than RF_VDD. The power voltage selector 392 includes a comparator 396 that inputs RF_VDD (at a positive input terminal) and EX_VDD (at a negative input terminal). The output of the comparator 396 is coupled to an input of an inverter 398 and to a gate of a first PMOSFET 400. The first PMOSFET 400 has a source coupled to EX_VDD and has a drain coupled to a drain of a second PMOSFET 402. The second PMOSFET 402 has a gate coupled to the output of the inverter 398 and has a source coupled to RF_VDD.

The power voltage selector 392 outputs a bias voltage VDD to an internal voltage generator 404 that uses VDD to supply power to the micro-computer 378. The power voltage selector 392 operates to select EX_VDD from the external voltage source 394 to be output as VDD when-ever EX_VDD is available, irrespective of the availability of RF_VDD. Such a power voltage selector 392 is advantageous when EX_VDD is a more stable voltage than RF_VDD.

The power voltage selector 392 in FIG. 11 is generalized from that of FIGS. 7 and 10 because EX_VDD is from any voltage source 394 that provides an alternative bias voltage EX_VDD that is more stable than RF_VDD (in addition to the example CNT_VDD received at a contact bank). Similar to FIGS. 7 and 9, the power voltage selector 392 of FIG. 11 selects RF_VDD from the RF_VDD generator 374 to be output as VDD if EX_VDD is not available and if RF_VDD is available, since RF_VDD is not as stable as EX_VDD.

In FIG. 11, the internal voltage generator 404 may simply use VDD from the power voltage selector 392 to bias the micro-computer 378. Alternatively, the internal voltage generator 404 may provide the micro-computer 378 with a voltage level that is further boosted from VDD.

The voltage level of RF_VDD as stored in the VDD status flag register 386 indicates to the data processor 380 whether RF signals are received by the antenna coils 206 and 208. The data processor 380 may use such indication from the VDD status flag register 386 in deciding a priority for processing contact data (CNT_IO) and contact-less data (RF_IO).

In addition, the data processor 380 sends a contact-less control signal (RF_CONTROL) stored within a control register 388 to indicate whether the data processor 380 is to process contact-less data (RF_IO). If RF_CONTROL indicates that the data processor 380 is to process RF_IO, the AND gate 390 passes RF_IO generated by the RF_IO extractor 376 to the contact-less data register 382. Thereafter, the data processor 380 processes RF_IO stored in the contact-less data register 382. On the other hand, if RF_CONTROL indicates that the data processor 380 is not to process RF_IO, the AND gate 390 prevents sending of RF_IO to the contact-less data register 382, and the data processor 380 does not process such RF_IO.

FIG. 11 illustrates an alternative chip card 370 for handling RF signals received by at least one of the antenna coils 206 and 208. The functionality for handling RF signals received by at least one of the antenna coils 206 and 208 is similar for FIGS. 10 and 11. However, the components and the configuration of the components in FIGS. 10 and 11 are different. The present invention may also be practiced with other various possible implementations, aside from the example embodiments of FIGS. 7, 10, and 11.

The present invention is limited only as defined in the following claims and equivalents thereof.

The invention claimed is:

1. A mobile phone comprising:
a chip card including:
a contact bank for making contact with the mobile phone;
a micro-computer;
a contact interface for transmission of contact data between the contact bank and the micro-computer;
a contact-less interface coupled to a contact-less terminal and for transmission of contact-less data between at least one antenna and the micro-computer;
a first switch that turns on to couple a contact bias voltage from the contact interface to the micro-computer whenever the contact bias voltage is available; and
a second switch that turns on to couple a contact-less bias voltage from the contact-less interface to the micro-computer when the contact-less bias voltage is available and when the contact bias voltage is not available,
wherein the first switch is configured to be turned on for coupling the available contact bias voltage to the micro-computer and wherein the second switch is configured to be turned off, even while the micro-computer receives and processes the contact-less data from the contact-less interface.

2. The mobile phone of claim 1, wherein each of the first and second switches is comprised of a field effect transistor.

3. A mobile phone comprising:
a chip card including:
a contact bank for making contact with the mobile phone and for transmission of contact data between the chip card and the mobile phone;
at least one antenna for transmission of contact-less data between the chip card and a terminal;
a first data register for storing one of the contact and contact-less data upon reception;
means for processing the stored one of the contact and contact-less data;
means for halting processing of the stored one of the contact and contact-less data upon detecting reception of the other one of the contact and contact-less data;
means for processing the other one of the contact and contact-less data that is newly received; and
means for resuming processing of the one of the contact and contact-less data stored in the first data register after processing the other one of the contact and contact-less data.

4. The mobile phone of claim 3, wherein the chip card further comprises a second data register for storing the other one of the contact and contact-less data that is newly received.

5. The mobile phone of claim 3, wherein the chip card further comprises means for selecting a contact bias voltage from the contact bank to supply power to the chip card and for uncoupling a contact-less bias voltage derived from a signal at the antenna, whenever the contact bias voltage is available.

6. The mobile phone of claim 5, wherein the chip card further comprises means for selecting the contact-less bias voltage to supply to the chip card when the contact-less bas voltage is available and when the contact bias voltage is not available.

7. The mobile phone of claim 3, wherein the chip card further comprises means for selecting processing just one of the contact data and the contact-less data.

8. A mobile phone comprising:
a chip card configured to make contact with the mobile phone, the chip card including:
a micro-computer;
a contact-less interface for deriving a contact-less bias voltage and contact-less data from a signal on at least one antenna;
a voltage source for generating an alternative bias voltage that is more stable than the contact-less bias voltage; and
a power voltage detector including:
a first switch that turns on to couple the alternative bias voltage to the micro-computer whenever the alternative bias voltage is available; and
a second switch that turns on to couple a contact-less bias voltage to the micro-computer when the contact-less bias voltage is available and when the alternative bias voltage is not available,
wherein the first switch is configured to be turned on for coupling the available alternative bias voltage to the micro-computer and wherein the second switch is configured to be turned off, even while the micro-computer receives and processes the contact-less data from the contact-less interface.

9. The mobile phone of claim 8, wherein the voltage source is a contact interface for deriving the alternative bias voltage as a contact bias voltage from a signal on a contact bank.

10. The mobile phone of claim 8, wherein each of the first and second switches is comprised of a field effect transistor.

11. A mobile phone comprising:
a chip card including:
a micro-computer;
a contact interface for transmission of contact data between a contact bank and the micro-computer, wherein the contact bank is in contact with the mobile phone;
a first register data register; and a contact-less interface for transmission of contact-less data between at least one antenna and the micro-computer, wherein the micro-computer includes:

a data processor; and a memory device having sequences of instructions stored thereon, and wherein execution of the sequences of instructions by the data processor causes the data processor to perform the steps of:

storing one of the contact and contact-less data upon reception in the first data register;

processing the one of the contact and contact-less data stored in the first data register;

halting processing of the one of the contact and contact-less data upon detecting reception of the other one of the contact and contact-less data;

processing the other one of the contact and contact-less data that is newly received; and resuming processing of the one of the contact and contact-less data as stored in the first data register after processing the other one of the contact and contact-less data.

12. The mobile phone of claim 11, wherein the chip card further comprises a second data register, wherein execution of the sequences of instructions by the data processor causes the data processor to perform the further step of storing the other one of the contact and contact-less data that is newly received in the second register.

13. The mobile phone of claim 11, wherein execution of the sequences of instructions by the data processor causes the data processor to perform the further step of detecting the reception of the other one of the contact and contact-less data by interrupt or polling.

* * * * *